United States Patent [19]

Murray et al.

[11] Patent Number: 5,378,893
[45] Date of Patent: Jan. 3, 1995

[54] RADIATION EVENT QUALIFIER FOR POSITRON EMISSION TOMOGRAPHY

[75] Inventors: Jonathan A. Murray, Sussex; John J. Williams, Hartland, both of Wis.

[73] Assignee: General Electric Company, Milwaukee, Wis.

[21] Appl. No.: 143,322

[22] Filed: Oct. 26, 1993

[51] Int. Cl.$^6$ ............... G01T 1/16; G01T 1/17; G01T 1/172
[52] U.S. Cl. .................. 250/363.03; 250/369
[58] Field of Search .......... 250/363.03, 363.04, 250/369

[56] References Cited

U.S. PATENT DOCUMENTS

| | | | |
|---|---|---|---|
| 4,284,890 | 8/1981 | Thompson | 250/363.03 |
| 4,394,576 | 7/1983 | Tanaka et al. | 250/363.03 X |
| 4,403,149 | 9/1983 | Govaert | 250/369 |
| 4,415,807 | 11/1983 | Friauf et al. | 250/363.03 |
| 4,736,097 | 4/1988 | Philipp | 250/221 |
| 5,032,728 | 7/1991 | Chang et al. | 250/363.03 X |

OTHER PUBLICATIONS

Ter-Pogossian, "Positron Emission Reconstruction Tomography for the Assessment of Regional Myocardial Metabolism by the Administration of Substrates Labeled with Cyclotron Produced Radionuclides", Conference: Cardiovascular Image Processing, Theory and Practice, Stanford, Calif., 1975, pp. 277–282.

Wong et al., "Characteristics of Small Barium Fluoride Scintillator for High Intrinsic Resolution Time of Flight Positron Emission Tomography" IEEE Transactions on Nucl. Sci., vol. NS-31, No. 1, 1984, pp. 381–386.

Yamamoto et al., "A BGD Detector Using a New Encoding Scheme for a High Resolution Positron Emission Tomography", Nuc. Inst. & Meth., A248, 1986, pp. 557–561.

Paper by D. A. Gedcke and W. J. McDonald entitled "A Constant Fraction of Pulse Height Trigger for Optimum Time Resolution," *Nuclear Instruments and Methods,* 1967.

Paper by David M. Binkley and Michael Casey entitled "Performance of Fast Monolithic ECL Voltage Comparators in Constant-Fraction Discriminators and Other Timing Circuits," 1988.

*Primary Examiner*—Constantine Hannaher
*Assistant Examiner*—Edward J. Glick
*Attorney, Agent, or Firm*—Quarles & Brady

[57] ABSTRACT

A PET scanner contains a positron emission event qualifier which prevents noise from being misinterpreted as such an event. A radiation detector signal indicates the intensity and duration of sensed gamma radiation. A comparator produces an intermediate signal when the radiation detector signal exceeds a predetermined threshold. A delay line delays the intermediate signal by an interval of time and blocks any pulses in the intermediate signal which are shorter than this interval. Typical noise in the intermediate signal is shorter in duration than this interval of time.

4 Claims, 2 Drawing Sheets

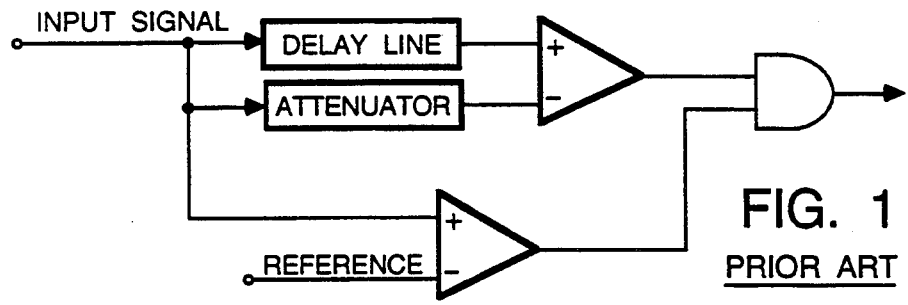
FIG. 1
PRIOR ART
FIG. 3
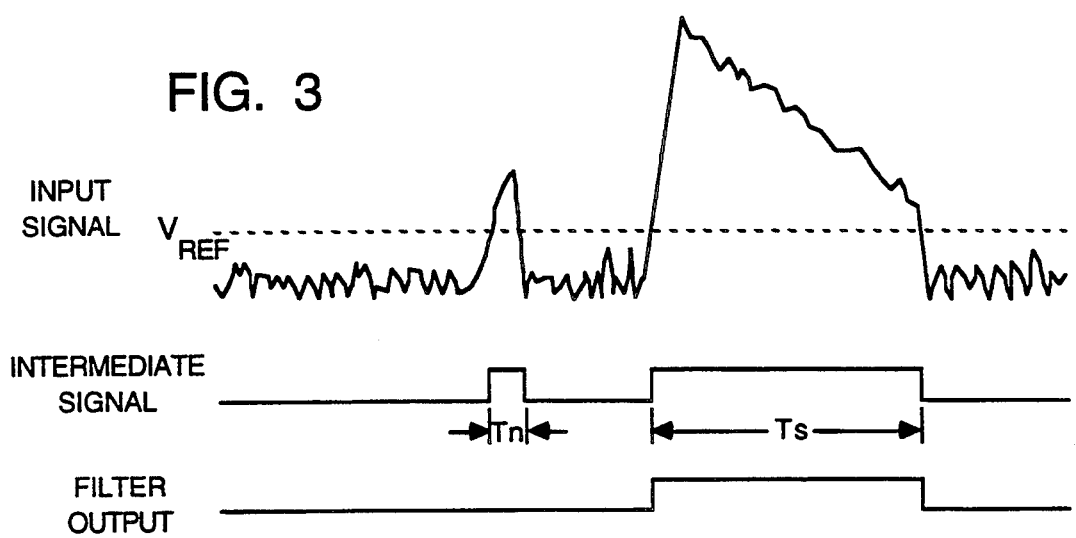
FIG. 4
EVENT QUALIFIER 60
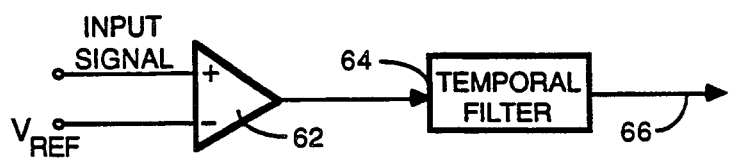

RADIATION EVENT QUALIFIER FOR POSITRON EMISSION TOMOGRAPHY

BACKGROUND OF THE INVENTION

This invention relates to positron emission tomography (PET) scanners, such as those used for medical imaging; and particularly to circuits employed in PET scanners to detect a positron emission event.

Positrons are positively charged electrons which are emitted by radionuclides that have been prepared using a cyclotron or other device. The radionuclides are employed as radioactive tracers called "radiopharmaceuticals" by incorporating them into substances, such as glucose or carbon dioxide. The radiopharmaceuticals are injected into the patient and become involved in such processes as blood flow, fatty acids, glucose metabolism, and protein synthesis.

Positrons are emitted as the radionuclides decay. The positrons travel a very short distance before encountering an electron, and when that occurs, the position is annihilated and converted into two photons, or gamma rays. This annihilation event is characterized by two features which are pertinent to PET scanners—each gamma ray has an energy of 511 keV and the two gamma rays are directed in nearly opposite directions. An image is created by determining the number of such annihilation events at each location within the scanner's field of view.

The PET scanner has a ring of detectors that encircle the patient. The detectors comprise crystals, referred to as scintillators, to convert the energy of each 511 keV photon into a flash of light that is sensed by a photomultiplier tube. Coincidence detection circuits connect to the detectors and record only those photons that are detected simultaneously by two detectors located on opposite sides of the patient. The number of such simultaneous events indicates the number of positron annihilation that occurred along a line joining the two opposing detectors. Within a few minutes hundreds of million of events are recorded to indicate the number of annihilation along lines joining pairs of detectors in the ring. These numbers are employed to reconstruct an image using well known computed tomography techniques.

Gamma rays are also produced by naturally occurring events which cause a signal pulse to be produced by the photomultiplier tube. A signal pulse also may result from noise in the photomultiplier tube and other electronic noise in the processing circuitry. As a consequence a mechanism has to be provided to qualify the photomultiplier tube signal to select gamma radiation from positron emission and prevent noise from being misinterpreted as a positron emission event.

Previous PET scanners employed a constant-fraction discriminator to reject electronic noise and generate a low jitter time mark when a positron emission event occurs. The time mark are used by the coincidence circuit to reject spurious radiation. With reference to FIG. 1, a constant-fraction discriminator works by comparing two signals derived from an input signal produced by the radiation detector. One of these signals is the input signal delayed and the other is the input signal attenuated in magnitude. A timing mark indicating a qualified radiation event was developed by determining when these two signals are equal, which is equivalent to determining when the difference of the two signals is zero. The delayed input signal was produced by a lumped inductor-capacitor type analog delay line which utilized a large number of discrete inductors and capacitors. This implementation had expense and size drawbacks because of the large number of constant-fraction discriminators required in a PET scanner, i.e. one for each radiation detector.

SUMMARY OF THE INVENTION

An object of the present invention is to provide a circuit that qualifies positron or other radiation emission events by processing a signal produced from sensing the radiation emitted by such events.

Another object is to provide such a qualifier circuit that prevents noise in the signal from being misinterpreted as a legitimate radiation emission event.

The radiation event qualifier circuit comprises an input terminal which receives a signal indicating the intensity and duration of light emitted from the scintillator. An binary intermediate signal is produced by a comparator whenever the radiation sensor signal exceeds a predetermined threshold indicative of the radiation emission event. A digital delay line, such as a silicon delay line, is connected to the output of the comparator and delays the intermediate signal by a predefined interval of time. The delay line has the characteristic that any pulses in the intermediate signal which are shorter in duration than the predefined interval are blocked and do not appear in the output signal from the delay line. By selecting the predefined interval to be longer in duration than noise which commonly affects the intermediate signal and shorter than the radiation emission event to be detected, the digital delay line prevents noise from being misinterpreted as a legitimate emission event to be processed. Thus the delay line passes only signal pulses of the proper duration and qualifies those pulses as representing a desired radiation event to process further.

BRIEF DESCRIPTION OF THE DRAWINGS

FIG. 1 is a block diagram of a prior art constant fraction discriminator;

FIG. 3 is a graph of the input signal to the event locator from the detector unit, and an intermediate signal produced in the event locator; and FIG. 4 is a schematic diagram of a positron emission event qualifier used in the PET scanner system.

DESCRIPTION OF THE PREFERRED EMBODIMENT

Figure 2:
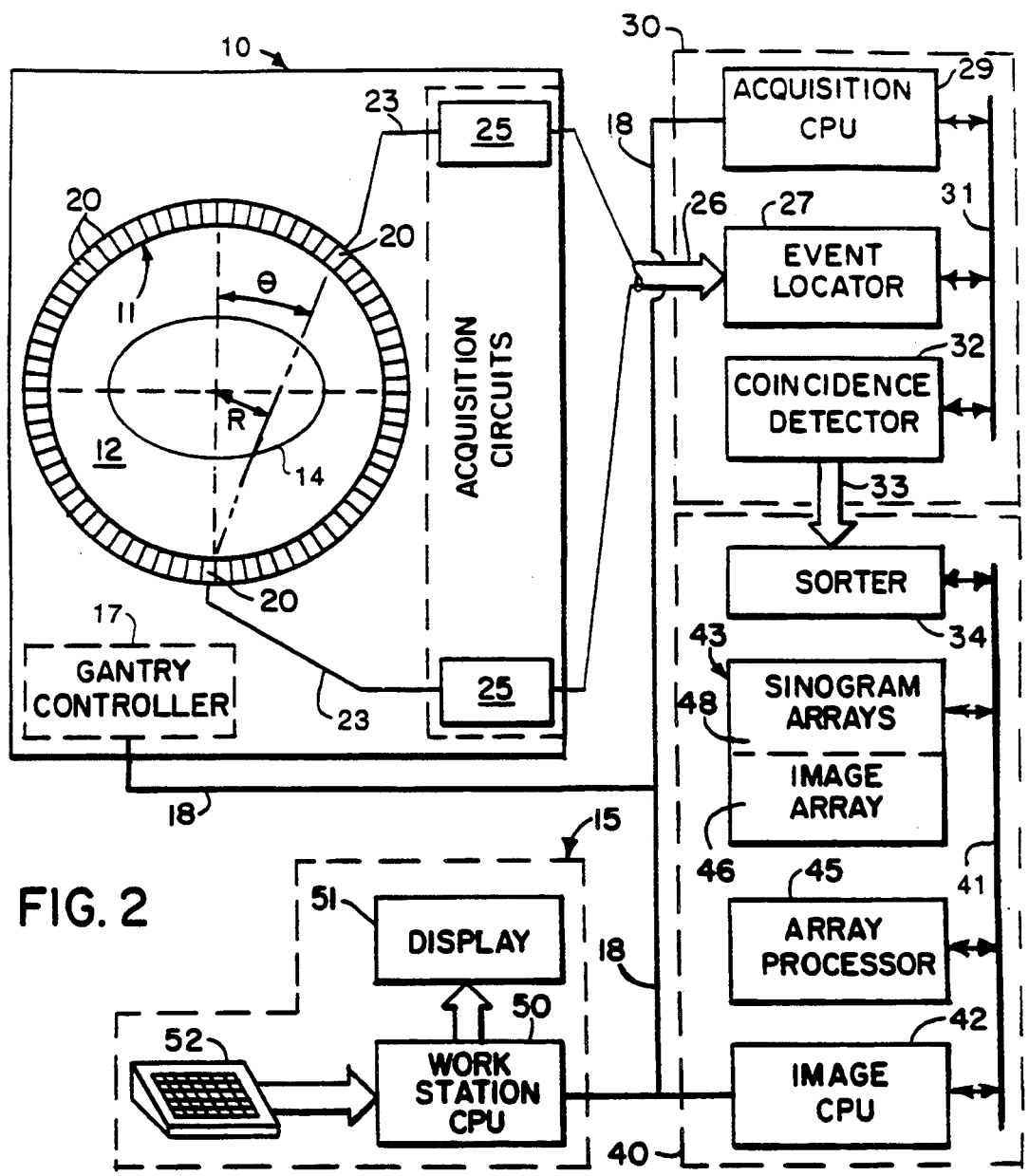
FIG. 2 is a schematic diagram of a PET scanner system which employs the present invention.

Referring particularly to FIG. 2, the PET scanner system includes a gantry 10 which supports a detector ring assembly 11 about a central opening, or bore 12. A patient 14 is positioned on a motorized table (not shown) in front of the gantry 10 and in alignment with the central axis of the bore 12. A table moves the patient 14 into the bore 12 in response to commands received from an operator work station 15. A gantry controller 17 is mounted within the gantry 10 and is responsive to commands received on a serial communication link 18 to operate the gantry.

The detector ring 11 is comprised of 112 radiation detector units 20, for example. Each radiation detector unit 20 includes a set of scintillator crystals arranged in a matrix that is disposed in front of four photomultiplier tubes. Each photomultiplier tube produces an analog signal on line 23 when a scintillation event occurs. A set of acquisition circuits 25 are mounted within the gantry 10 to receive these signals and produce digital signals indicating the event coordinates (x,y) and the total energy. These are sent through a cable 26 to an event locator circuit 27 housed in a separate cabinet. Each acquisition circuit 25 also produces an event detection pulse which indicates the exact moment the scintillation event took place.

The event locator circuits 27 form part of a data acquisition processor 30 which periodically samples the signals produced by the acquisition circuits 25. The processor 30 has an acquisition CPU 29 that controls communications on a backplane bus 31 within the processor and on the local area network 18. The event locator circuits 27 assemble the information regarding each valid event into a set of digital numbers that indicate precisely when the event took place and the position of the scintillator crystal which detected the event. This event data packet is conveyed to a coincidence detector 32 which is also part of the data acquisition processor 30.

The coincidence detector 32 accepts the event data packets from the event locators 27 and determines if any two of them are in coincidence. Coincidence is determined by a number of factors. First, the time markers in each event data packet must be within 12.5 nanoseconds of each other, and second, the locations indicated by the two event data packets must lie on a straight line which passes through the field of view in the scanner bore 12. Events which cannot be paired are discarded, but coincident event pairs are located and recorded as a coincidence data packet that is conveyed through a serial link 33 to a sorter 34. For a detailed description of the coincidence detector 32, reference is made to co-pending U.S. Pat. No. 5,241,181 filed on Jul. 27, 1992 and entitled "Coincidence Detector For A PET Scanner" which is incorporated herein by reference.

The sorter 34 forms part of an image reconstruction processor 40. The sorter 34 counts all events occurring along each projection ray (R,$\theta$) and organizes them into a two dimensional sinogram array 48 which is stored in a memory module 43. The image reconstruction processor 40 also includes an image CPU 42 that controls a backplane bus 41 and links it to the local area network 18. An array processor 45 also connects to the backplane 41 and it reconstructs images from the sinogram arrays 48. The resulting image array 46 is stored in memory module 43 and is output by the image CPU 42 to the operator work station 15. For a detailed description of the sorter 34, reference is made to U.S. Pat. No. 5,272,343 filed on Jul. 27, 1992 and entitled "Sorter For Coincidence Timing Calibration In A PET Scanner" which is incorporated herein by reference.

The operator work station 15 includes a CPU 50, a CRT display 51 and a keyboard 52. The CPU 50 connects to the local area network 18 and scans the keyboard 52 for input information. Through the keyboard 52 and associated control panel switches, the operator can control the calibration of the PET scanner, its configuration, and the positioning of the patient for a scan. Similarly, the operator can control the display of the resulting image on the CRT display 51 and perform image enhancement functions using programs executed by the work station CPU 50.

The event locator 27 includes a circuit that qualifies each pulse received from a radiation detector unit 20 and generates a time mark for only those pulses that satisfy the criteria which characterizes a scintillation event. By detecting the first electron of the scintillation, optimal determination of event time theoretically is possible. However, false detection due to photomultiplier tube single electron noise and electronic noise will occur. Selection of a threshold voltage $V_{REF}$ above the electronic noise will eliminate false triggers from that noise as shown in FIG. 3. Then the photomultiplier tube single electron noise can be eliminated by time width qualification. The scintillation time interval, Ts, is well defined and is relatively long as compared to the duration of noise, Tn. Thus a qualification time criterion, Tc, can be chosen such that Tn<Tc<Ts.

FIG. 4 shows such an event qualifier 60 which has a comparator 62 that compares the signal from a radiation detector unit 20 to a fixed threshold voltage, for example 100 millivolts. When the radiation detector unit signal is above that threshold the comparator 62 produces a high logic level intermediate signal at its output and a low logic level intermediate signal at other times. Thus the comparator 62 digitizes the radiation sensor signal into a binary intermediate signal. In response to a positron emission event, the comparator 62 produces an high logic level output pulse that is approximately 400 nanoseconds in duration. Noise in the system will be significantly shorter in duration, less than 75 nanoseconds for example.

The intermediate signal from the comparator 62 is coupled to the input of a temporal filter 64, which preferably is a digital, silicon delay line, such as model DS1013 made by Dallas Semiconductor Corporation. The silicon delay line 64 delays each digital logic level transition in the intermediate signal by a fixed delay period and unlike conventional delay lines, can not pass pulses that are shorter in duration than the delay period. This is not a typical characteristic of delay lines where it is desirable that the delay line produces an output signal which accurately corresponds to the input signal, no matter how brief a signal pulse is received.

The qualification and radiation event detection processes do not require a signal delay, rather the delay line 62 is used solely as a temporal filter. That is, the silicon delay line 64 is employed as a device that filters out any pulses that are shorter than a predefined duration (e.g. 75 nanoseconds) which is longer that a typical noise pulse, yet shorter than a legitimate signal pulse resulting from positron emission. Thus the present event qualifier 60 produces an output pulse on line 66 only when the input pulse from the associated radiation detector unit 20 is longer in duration than the delay period of delay line 64.

Although the present invention has been described in the context of a positron emission tomography system, it has equal applicability to other apparatus that has a slow event scintillator and a fast photomultiplier tube. For example this event qualifier can be employed with gamma cameras and other scintillator pulse detection systems.

We claim:

1. A circuit for qualifying an occurrence of a radiation emission event for further processing comprises:

an input terminal for receiving a radiation detector signal indicating the intensity and duration of radiation emitted from a patient and striking a radiation detector;

a comparator connected to said input terminal and producing an intermediate signal when the radiation detector signal exceeds a threshold level as occurs during the radiation emission event; and a digital delay line connected to the output of the comparator and delaying the intermediate signal by a predefined interval of time, said digital delay line blocking any pulses in the intermediate signal which are shorter in duration than the predefined interval of time.

2. The circuit as recited in claim 1 wherein said digital delay line is configured so that the predefined interval is shorter than the typical pulse of the intermediate signal that results from a positron emission event and is longer than a typical noise pulse.

3. The circuit as recited in claim 1 wherein said digital delay line is a silicon delay line.

4. A circuit for use in a PET scanner to qualify detected radiation being produced by a positron emission event, said circuit comprising:

an input terminal for receiving a radiation detector signal indicating the intensity and duration of radiation emitted from a patient and striking a radiation detector;

a device connected to said input terminal and producing an binary signal having a level which indicates when the radiation detector signal exceeds a threshold level as occurs during a positron emission event; and a digital delay line connected to the comparator to delay the binary signal by a predefined interval of time, said digital delay line blocking any pulses in the binary signal which are shorter in duration than the predefined interval of time, wherein the predefined interval is longer than noise in the binary signal and shorter in duration than a positron emission event.

* * * * *